Patented Nov. 3, 1936

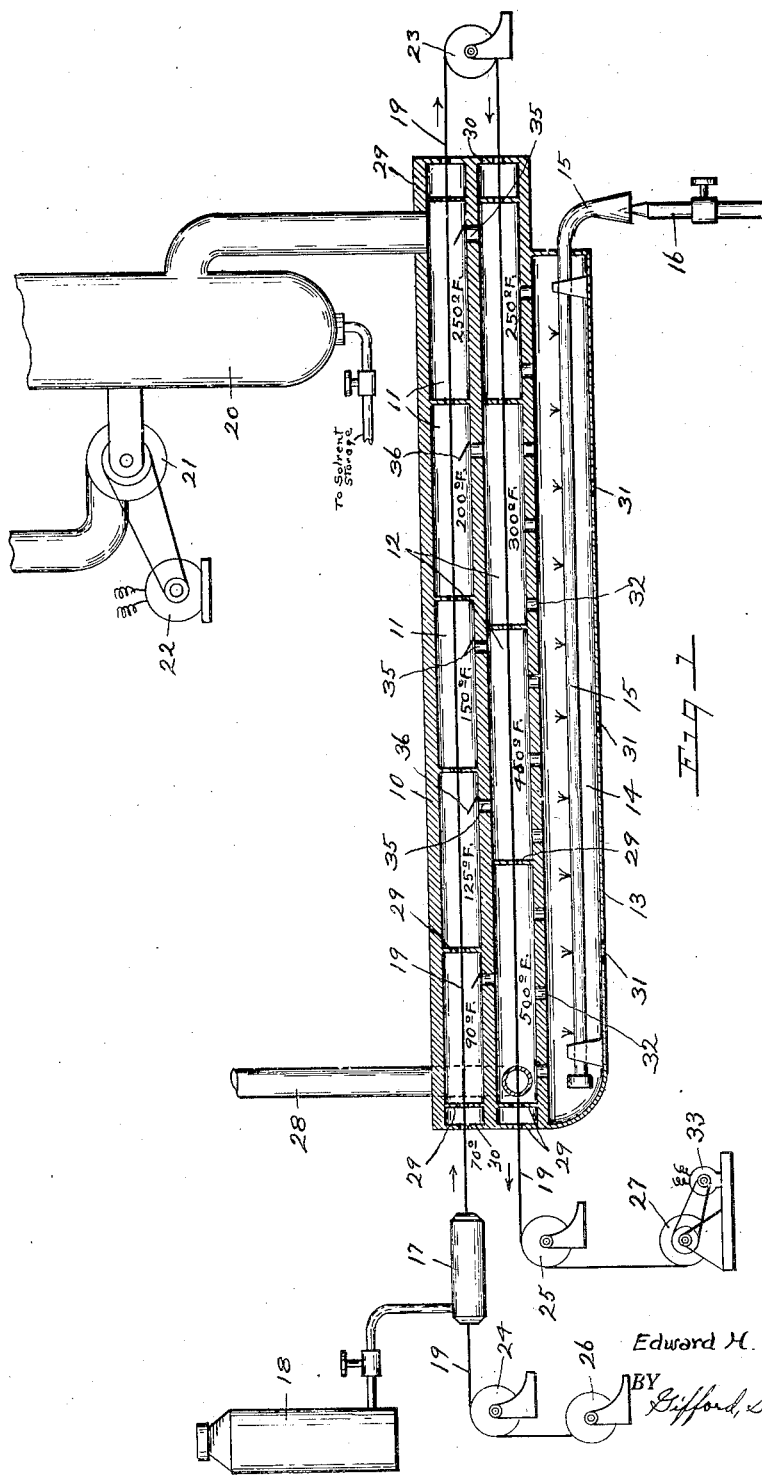

2,059,441

UNITED STATES PATENT OFFICE 2,059,441

COATING COMPOSITION FOR WIRE AND PROCESS

Edward H. Converse, Poughkeepsie, N. Y., assignor, by mesne assignments, to Case, Pomeroy & Company, Inc., New York, N. Y., a corporation of New York Application January 3, 1933, Serial No. 649,740
Renewed March 5, 1936

2 Claims. (Cl. 91—70)

This invention relates to electrically insulated wire and particularly to so-called "enamel insulated wire", and the object of the invention is to provide a wire with a coating which shall have desirable mechanical characteristics in addition to being non-inflammable and of high dielectric strength. Certain features of this application were disclosed in my prior application Serial No. 516,833, filed Feb. 18, 1931.

A feature of the coating is that it is impervious to softening or dissolving in either mineral or vegetable oils.

A further feature is that wire may be insulated by this process at a far greater speed of production than the varnish type of enamel coatings, and to provide a coating solution with which there is no loss of solid content in process due to exposure, air or heat. However, the thinner or solvent that is used may be recovered. A substantial saving over the varnish type of coating is effected with this invention, while all of the mechanical and electrical advantages of the varnish type of coating are retained and on several points of comparison bettered.

Many attempts have been made heretofore to use the esters of cellulose for coating wire for insulating purposes, with results, when compared to the varnish type as at present in use, that have prevented the cellulose coating from taking its place in the enameled wire field.

Heretofore when either the acetate or the nitrate ester of cellulose was used and applied to wire as a varnish, the coatings have had extremely poor adhesion to the metal wire, were not flexible enough, became brittle on ageing, would not stand the stretch test without cracking or "tubing" and were in general not a product which would compete with the varnish type of coating. By the varnish type I means the prevalent tung oil, resins, linseed oil, etc., type which is baked or polymerized by heat upon the wire or conductor. The test specifications for this varnished wire are extremely rigid and have heretofore not been met by the cellulose types of coating, either applied as a varnish with suitable solvents or mixed with phenol or reaction types of mixtures or mixed with synthetic resins and plasticizers, etc.

It has been found that reaction types of mixtures used as coatings, while giving adhesion, also give brittleness and "tube" readily on stretching the wire and the insulation cracks or checks on a sharp bend test, but the greatest drawback is in the manufacturing process, as usually the coating solution when made up in sufficient quantity for a production run will begin to react in the tanks and pipes and its viscosity cannot be controlled. Also any catalyst present, whether of the acid or alkali type, gives a poor insulating coat as its presence apparently leaves the coating hygroscopic.

Plasticizers used in such coatings usually while lending flexibility, give poor adhesion and gradually dry out, thereby causing brittleness. Natural resins as used heretofore usually cause the coating to soften when heated to the extent that usually occurs in the average electrical appliances which use this type of wire. These resins are detrimental, as they cause short circuits to occur between turns of a coil, etc. They also cause brittleness, etc., when they are baked on the wire at a heat sufficient to overcome the softening effect above described.

I find that cellulose can be utilized in making varnish coatings without sacrifice of any of the important characteristics, electrical or mechanical, by the process herein described. These coatings are very desirable as they have further advantages of their own.

Commercial cellulose acetate in its raw state, resembles dry white asbestos somewhat. If this dry material is heated in a ladle over a Bunsen flame carefully it will go to a semi-fluid mass resembling melted sugar in appearance. When the melted mass cools it forms a solid translucent cake that is brittle and non-elastic and has no marked adhesive qualities.

Commercial furfural ($C_4H_3 \cdot O \cdot CHO$) is a high temperature boiling liquid solvent for cellulose acetate. It has the property of forming inherent resins in its liquid body. That is, even if furfural is distilled until it is water-white it will gradually go back to its normal color, a very dark brown, almost black, due to inherent resinification, the resinification slowing up when it approaches a given point of saturation. The furfural resin is always present in the regular grade of commercial furfural.

Upon evaporating commercial furfural, a tarry resin residue remains. If this tarry residue is mixed with dry acetate and stirred in when the acetate is in a heated fluid condition, a mass is obtained on cooling which is of a horny character. It is a somewhat elastic extremely tough cake of high gloss that has great adhesive strength, and is hard to get out of the ladle. Tests show high dielectric strength. It is this composition which I use for my insulating coating.

It is to be noted that the resin cellulose mixture will melt at a lower temperature than when cellulose alone was heated, showing that the resin probably exerted a solvent action upon the cellulose under heat.

In my process, I do not distill off the liquid portion of the furfural separately but use it as a high boiling solvent which when evaporated from the coating film leaves the resin residue perfectly combined with the cellulose coating.

For example, I dissolve cellulose acetate in a low boiling solvent, in a mixture such as acetone, or methyl or ethyl acetate or ethylene dichloride and alcohol or a solvent with diluents, such as benzene with methyl or ethyl alcohol, and to this I add 30% of commercial furfural using 70% of the low boiling solvents and use sufficient acetate to make up a 10 to 20% solid content solution.

It is to be noted that the acetate can be had in various viscosities and if a low viscosity is used a high solid body content can be had without sacrifice of flowability and covering qualities for coating the wire.

The proportions may be varied from those given, but less than 20% furfural does not give good results. I may also use furfural alone without other solvents, but this would require increasing the time of drying the coating which is important from the high rate production standpoint which my process has in its favor.

The coating solution made from the above ingredients will not change its form or viscosity and will keep indefinitely in storage and in process as against the reaction resin types of cellulose coating solutions which continue to react in storage and during the process of applying them.

In order to use this coating to its full advantage I employ an oven having distinct increasing heated zones. By this I mean portions of the oven are arranged progressively to give a low heat where the freshly coated wire enters, a portion where the low boiling solvents such as the acetone, leaves the coating, a portion where the high boiling furfural leaves the film, and a portion of the oven where the dry wire is exposed to high heat to cause the resin residue and cellulose to effect a combination together on the wire to give the proper finished coating.

The length of oven having the heat arranged as described will determine the speed at which the wire can be coated, an oven 8 feet long having two distinct compartments, upper and lower, arranged for the wire to enter and return through each compartment, will give a production rate eight times that of similar size wire when the varnish process is used.

The upper compartment has a room temperature of, say, 70 degrees F. to 250 degrees F., and the wire will come out of this compartment dry in all respects. It goes around a sheave wheel and is returned through the lower compartment at a graduated temperature of, say, 250 to 500 degrees F.

The steps the coating takes in drying in the oven etc., are very important so I stress the point that for various low boiling solvent mixtures the oven drying temperatures must be adjusted to them to make perfect wire, as various solvents have different evaporating rates and the heat in the oven should be adjusted to suit these while the wire travels at a certain speed, the speed being determined largely by the size of the wire.

As an example, I may use 70% acetone and 30% furfural by volume and enough cellulose to make up a 15% solid body solution. I employ only enough heat in the first portion of the oven to cause the acetone to leave the wet coating without disruptive action. It does this between the room temperature at the oven entrance and about 150 degrees F. point of heat in the oven, so my heated portion of the oven for this solvent is made long enough to allow time for the acetone to leave the coating; the furfural begins to go off at this temperature, but enough remains to keep the film of coating semi-liquid so that the vapors of the acetone can leave without causing pinholes. That is, if they do bubble through, the coating will again seal. The furfural has a higher boiling point (166 degrees C.) and gradually goes off as vapor when the wire coating goes into the 200 degrees F. zone of the oven. It has left the film when it reaches the 250 degree F. zone, so that the coating is then dry on the wire. The wire can then be handled, run over pulleys, etc., without damage or injury to the coating, but if spooled for use at this stage it would show the same mechanical defects, i. e., poor adhesion, tubing under stretch test, brittleness when aged by standing, only fair dielectric strength, etc., as is the case with prior attempts at a cellulose type of coating for wire insulation. After this treatment I pass the wire into the highest heat zone of the oven where the residue resin that was formerly in the liquid furfural is dispersed throughout. The cellulose is heated and an apparently new combination or reaction under the heat is effected, which greatly changes the characteristics of the coating as it now adheres firmly to the wire. It will stretch without tubing to the extreme breaking point of the wire; it will not soften with heat; it is of high dielectric strength; it is not hygroscopic; it stands boiling oils both vegetable and mineral; it does not become brittle even when exposed to oxygen gas for an age test; and it acts like an entirely different product from that which has not been exposed to the last high oven heat.

By passing the wire through the coating bath several times the coat is brought up to the desired thickness which is required for the particular size of wire, each coat being dried and subjected to the high heat as the whole coating is built up to the desired size or thickness.

The high heat point of the oven will vary somewhat with the amount of furfural residue and the grade and viscosity of the acetate used, but I have made good wire at temperatures from 300 to 550 degrees F. and I can go to a higher heat in the oven without injury to the insulation. For economy of manufacture, however, the lowest heat which will cause the change is desirable.

Just what happens chemically to the cellulose I am not quite certain, but the mechanical action, however, is to soften the coating in the high heat on the wire. I do not mean by saying that the coating is softened that it becomes fluid, but it becomes plastic and when once cooled off will not soften again under heat, but will char rather than become soft, so I conclude that the cellulose has changed its chemical form and properties in some manner.

The low boiling solvents which I use may be recovered by connecting the low heat portion of the oven to a proper solvent recovery system.

This is not possible with the varnish type of coating as the high heat used for baking (600 to 900 degrees F.) causes the resins and oils to distil and throw off a smoke which is gummy and cannot be so recovered. Also, the varnish will jell and a skin will form over it where it is exposed to the air. When it is in this partly oxidized or polymerized state it cannot be dissolved again successfully so that it must be strained out of the coating solution and discarded. This represents a large loss in solid content.

The coating material or composition which I employ, even if dry, in the coating tank, can be put back in solution again for use by adding sufficient solvent to give it proper fluidity as the solid content will readily redissolve again, as no reaction materials are employed, nor does it oxidize if exposed to air.

I have substituted cellulose nitrate for the acetate and with the proper heat which is more critical in the higher stage and found the same advantages, but the nitrate coated wire is not fireproof and no apparent advantage is gained by the use of this nitrate ester instead of the acetate ester.

In carrying out my process of coating a wire any oven having graduated temperatures near its open end where the wire enters the oven with the interior of high baking heat could be used if the wire were run slowly enough through the oven and results similar to those described above would take place. However, such a process would be impractical from a production standpoint. Since the solution employed is capable of high speed working, a proper oven with the stages of heat as described above gives the better results.

The accompanying drawing shows the temperature of these heat stages where the low boiling solvent is acetone, the oven being eight feet long with the rate of wire travel 400 feet per minute.

Only one coating is shown for the sake of clearness and in practice three to five coats are generally employed depending on the thickness of the insulation required.

Where the wire is of considerable mass and going through the process at high speed, the heat can be somewhat higher as the wire is not in step or is lagging behind the oven temperatures so the heat must be adjusted accordingly.

There may be other chemical bodies of high boiling qualities which could be used in place of furfural and I wish to point out that I could add the furfural residue resin separately to the cellulose and I wish to include such within the appended claims. It is also possible to mix in other high boiling solvents with the furfural, such as ethyl lactate, diacetone alcohol, dichlorethyl ether, ethyl glycol acetate alcohol in proper proportion using them for their high boiling qualities, if required, without departing from the results obtained, where heat treatment as described would impart to the coating the desired properties.

The drawing shows a partial longitudinal section of a somewhat diagrammatic layout of apparatus suitable for carrying out my process.

The numeral 10 denotes a horizontal oven divided into an upper chamber 11 and a lower chamber 12, while below the lower chamber 12 is mounted a guard 13 forming a burner chamber 14 within which is mounted any suitable heating element such as a gas burner 15 which is fed from the gas pipe 16; said burner being formed with a series of holes for escape of the burning gas.

The guard 13 is formed with a series of holes 31 for supplying air to the burner, and the bottom of the lower oven chamber 12 is also formed with a series of holes 32.

Adjacent one end of the oven is mounted the coating applicator 17 which is supplied with coating solution from the supply tank 18, the wire 19 traveling through the applicator 17, where it receives its coat, from the sheave 24 and supply spool 26, through the upper chamber 11, around the sheave 23 and back through the lower chamber 12, over the sheave 25 to the take-up spool 27 which is rotated by a source of power 33.

The chambers 11 and 12 are each provided with the ends 30 having an opening through which the wire can pass, and also with the dividing walls 29 which are also provided with openings for the wire and which divide the oven chambers into zones of different temperatures as indicated, and vents 35 are arranged so that heat will pass up into the upper chamber from the lower to maintain the temperature correctly in the different portions or zones, and these vents are provided with adjustable closures 36.

If the circulation of air is arranged correctly the dividing walls 29 may be dispensed with as the draft up the stack 28 will pull the heat to the stack end of the oven, thus the heat will be higher at the stack end of the oven.

The lower oven chamber 12 is provided with a vent stack 28, which may also communicate with the upper chamber 11, and the other end of the upper chamber 11 is provided or connected with a solvent recovery apparatus 20 having a suction fan 21 and a motor 22 for drawing the solvent fumes through the recovery apparatus and to create fresh air circulation through the chamber 11.

It is understood that any other suitable construction and arrangement may be used in place of that shown or indicated.

The oven could have a single compartment if desired, the wire entering at one end and leaving at the other end, or could be arranged vertically instead of horizontally and is adaptable to various requirements so long as different heats are formed for drying and final heating of the coating.

I claim:

1. A wire coated with an insulation consisting of a cellulose ester and furfural residue resin.

2. A wire coated with insulation consisting of a cellulose ester and furfural resin which has been subjected after coating to heat sufficient to melt the cellulose ester.

EDWARD H. CONVERSE.